S. JOSEPH.
CASING FOR VEHICLE SPRINGS.
APPLICATION FILED AUG. 8, 1916.

1,215,379.

Patented Feb. 13, 1917.
3 SHEETS—SHEET 1.

Simon Joseph
Inventor
by Lawrence Langner
Attorney

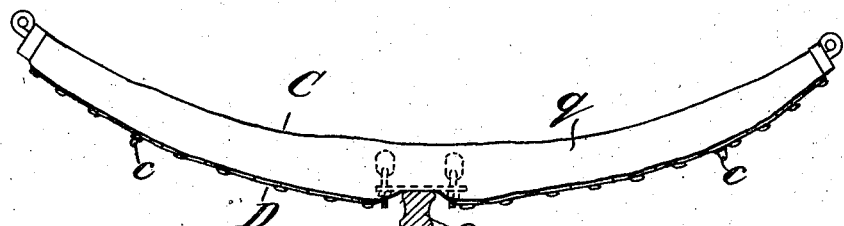
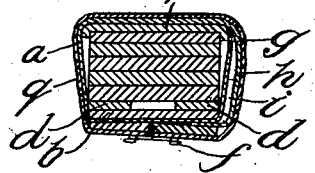
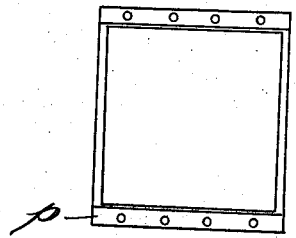
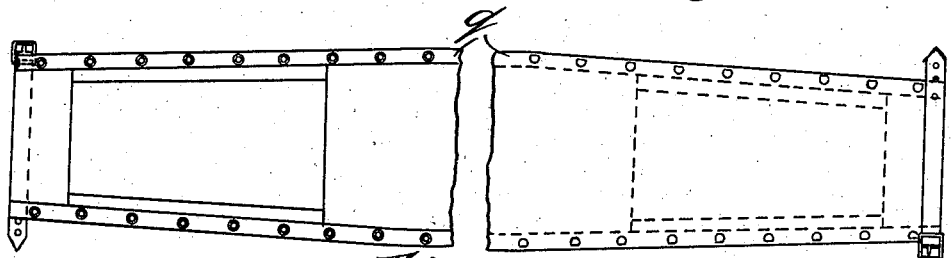
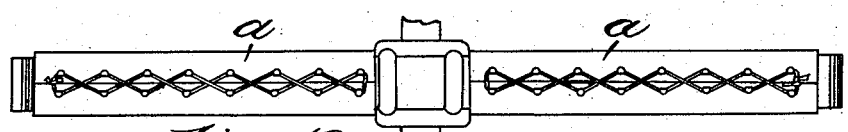
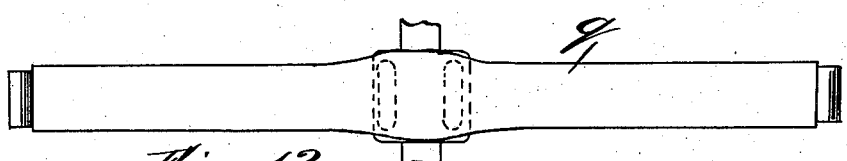

S. JOSEPH.
CASING FOR VEHICLE SPRINGS.
APPLICATION FILED AUG. 8, 1916.

1,215,379.

Patented Feb. 13, 1917.
3 SHEETS—SHEET 3.

Simon Joseph
Inventor
by Lawrence Langner
Attorney

UNITED STATES PATENT OFFICE.

SIMON JOSEPH, OF LONDON, ENGLAND, ASSIGNOR TO BROWN BROTHERS LIMITED, OF LONDON, ENGLAND.

CASING FOR VEHICLE-SPRINGS.

1,215,379. Specification of Letters Patent. Patented Feb. 13, 1917.

Application filed August 8, 1916. Serial No. 113,735.

*To all whom it may concern:*

Be it known that I, SIMON JOSEPH, a subject of the King of Great Britain, and resident of London, W., England, have invented certain new and useful Improvements in Casings for Vehicle-Springs, of which the following is a specification.

This invention relates to casings or "gaiters" for the springs of vehicles. It is the principal object of the invention to provide casings or gaiters for such springs which will effectively contain and maintain the supply of lubricant while also effectively repelling moisture.

Another object is to provide a casing or gaiter which can readily be applied to a vehicle spring and laced up or otherwise fastened, and into which casing lubricant can be injected, the casing serving to conduct the lubricant in the required direction for keeping the spring leaves lubricated.

A further object is to provide a casing or gaiter which when applied to a vehicle spring will be closed along its overlapping edges and around its ends in such a manner that it will hold the lubricant without risk of the escape thereof, while the closure will be effective in repelling moisture, thus making it impossible for the springs to become rusted or ineffective through atmospheric deterioration.

A still further object is to provide a casing for vehicle springs with an inner portion serving to contain the lubricant and an outer or inclosing portion which will not be in direct contact with the lubricant and will therefore maintain a tidy appearance, this outer casing however being so arranged as not to interfere with the supply of further lubricant and not to impede access to the inner casing when required.

The invention is illustrated by way of example in the accompanying drawings which show several forms of construction thereof.

Figure 1:
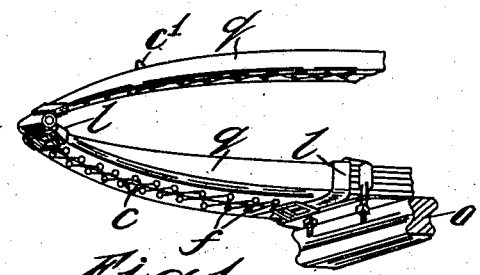
Figure 1A:
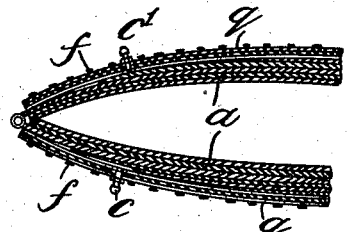
Figure 2:
Figure 3:
Figure 4:
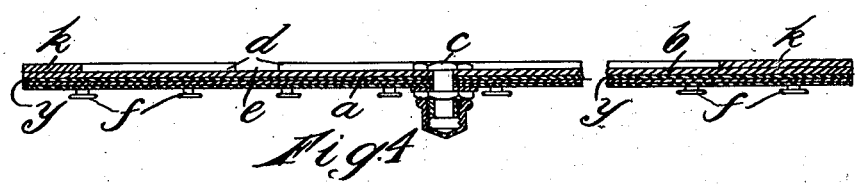
Figure 5:
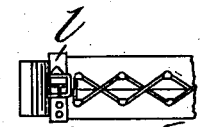
Figure 6:
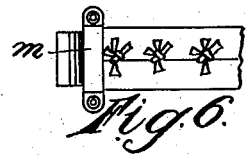
Figure 7:
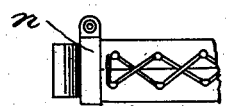
Figure 14:
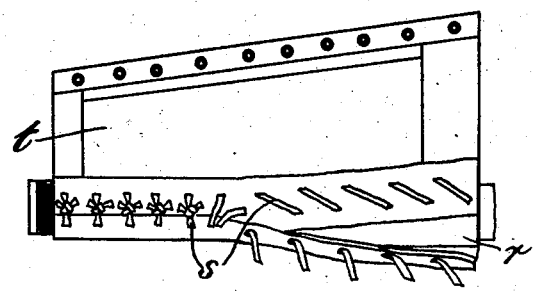
Figure 15:
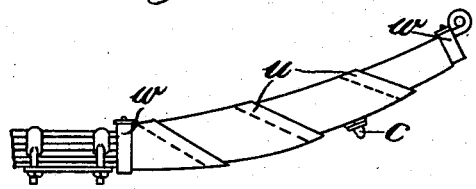
Figure 16:
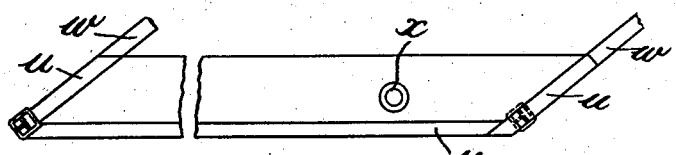
Figure 17:
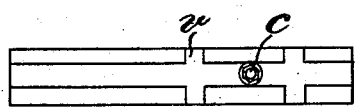

In the drawings, Figure 1 is a perspective view showing a spring bearing upon an axle $o$, and with a gaiter applied thereto. Fig. 1ª shows a longitudinal section of the spring and inclosing casings shown in Fig. 1. Fig. 2 shows the inside of the gaiter when opened out. Fig. 3 shows the outside thereof when opened out. Fig. 4 shows a longitudinal section on the line A—B of Fig. 2. Figs. 5, 6 and 7 are detail views of ends of gaiters with various forms of fastenings applied thereto. Fig. 8 shows a side view of a complete spring with gaiters and an outer cover or sheath applied thereto. Fig. 9 shows a cross section on the line C—D of Fig. 8. Fig. 10 shows the inside of the outer cover or sheath when opened out. Fig. 11 shows the inside of a cover for the center part of the spring. Fig. 12 shows a plan of a complete spring with two gaiters applied thereto, and Fig. 13 a plan with an outer cover over the gaiters seen in Fig. 12. Fig. 14 shows a double gaiter partly closed. Fig. 15 shows another form of gaiter in use. Fig. 16 shows the same opened out, and Fig. 17 shows the pad for use therewith.

Referring first to Figs. 1 to 4, $a$ is the gaiter of leather or the like, $b$ is a felt pad intended to lie along under the spring, and $c$ is a nipple for enabling grease to be injected into the gaiter when it is applied to the spring. The nipple $c$ at its inner end opens into a longitudinal groove in the pad $b$, formed for instance by attaching additional strips $d$ of felt along each side of the pad $b$. The pad $b$ is about as wide as or rather wider than the spring to which the gaiter is to be applied, so that it may lap a little around the corners thereof; transverse channels formed at $e$ may be used to facilitate the feeding of the grease around the sides of the spring at a few places so as to lubricate the edges thereof. The gaiter has hooks $f$ on its outer face by means of which it is laced up around the spring. The holes where the rivets of the hooks pass through the leather of the gaiter may be covered by an inner layer of leather or the like as indicated at $y$ in dotted lines in Figs. 2 and 3, and in section in Fig. 4. The edge $g$ of the gaiter is lapped first against the spring at one side, the hooks $f$ being set back from this edge of the gaiter so that they lie underneath the spring when the gaiter is wrapped around the same. The gaiter completely incloses the spring and its other edge $h$ laps over the edge $g$, being secured by laces engaging with the hooks $f$ as shown along the under side of the spring. Inside the edge $h$ of the gaiter a narrow strip of felt $i$ is preferably provided, and further strips $k$ inside the ends thereof, these strips being saturated with grease so that they form fluid-tight and practically airtight closures at the edges and ends of the gaiter. The ends may be secured around the spring by straps $l$, (Fig. 5) metal clamps $m$ (Fig. 6) or clips $n$ (Fig. 7) or any other convenient fastening devices. The ends should be fastened so tightly that no grease can escape nor water enter there. A strip of felt or like material is preferably laid along the top of the spring before the gaiter is applied thereto, in order to cover over the sharp corners of the spring and to prevent damage to the gaiter thereby. Such a strip of felt is shown in section at $r$ Fig. 9, hereinafter referred to. It should be well greased before it is applied, so that it will resist ingress of moisture.

The gaiter as shown in Figs. 1 to 4 is effective and satisfactory in most respects, but when it is filled with grease the leather tends to become dull in appearance, and in order to add finish to the device of Figs. 1 to 4, it is desirable to employ with it an outer cover or sheath; this may be of leather, American cloth, or any other suitable material, and may be laced, tied or fastened around the gaiter in any suitable way, or may be attached thereto along one edge, and arranged to form a second coil around the spring outside the grease-holding gaiter.

Fig. 8 shows a complete spring secured at its center to an axle $o$ and having two separate gaiters or even one long gaiter first applied thereto, then a short cover $p$ (Fig. 11) over the middle portion where the axle clamp lies, and finally an outer cover or sheath $q$ (Fig. 10) over the whole spring, lacing along the under side thereof. Wherever an outer cover is used it is preferably laced so that its edges lie one at each side of the nipple $c$ for feeding in lubricant, so that the nipple projects and is accessible at all times, without undoing any part of the outer cover or sheath. This sheath may have pads of felt ($r$ Fig. 9) or the like at any parts thereof where required, for instance at the middle where the axle clamp might make a sharp projection that would damage the leather, and along the edges and ends to prevent ingress of moisture and so forth. The section, Fig. 9, shows how the gaiter and cover overlap and surround the spring.

The inner covering or gaiter need not be made to close along the under side of the spring when an outer cover is used, as the outer cover can be made to close below and so to throw off all falling moisture. For instance, Fig. 12 shows in plan a whole spring with two gaiters, one on each end thereof, and Fig. 13 shows a cover over both gaiters and the center part of the spring as well. The edges of this gaiter overlap or meet below the spring and are laced or otherwise secured together, but of course they cannot quite close in the center part where the axle crosses below the spring.

Fig. 14 shows in plan a combined gaiter and outer sheath. The inner part or gaiter is shown partly closed, its edges overlapping along the top of the spring and being tied together by tabs $s$ sewn on, or closed in any other convenient and effective manner. The outer sheath $t$ is secured to the bottom part of the gaiter, and when lapped over the same it is closed by lacing or otherwise along the bottom line. Both the gaiter proper and the sheath may be provided with felt pads along their ends and their overlapping edges.

The invention is not limited to the use of a gaiter meeting along a longitudinal line, and the gaiter may be fitted and arranged to be closed in any convenient way provided that it contains the absorbent pad for holding the grease in contact with the spring, and that it is effectively secured against escape of lubricant and ingress of moisture. For example, the gaiter may be wound on spirally as indicated in Figs. 15 to 17. The gaiter here has a strip of absorbent material at $u$ along its edge and at its ends, and when applied to the spring the edge with the pad $u$ therein overlaps the other as seen in Fig. 15. The ends are secured by clips, or by straps $w$ or otherwise. The pad of felt to lie along the bottom of the spring is made separate in this case, and is shown at $v$ Fig. 17. The nipple $c$ thereof projects through a hole in the strip of leather or the like which constitutes the gaiter, this hole having a ring of felt $x$ around it inside the same so as to make a close joint when the felt is saturated with grease. A separate strip of felt or the like ($r'$ Fig. 9) should also be laid along the top of the spring in this case before the gaiter is applied. The pad $v$ is then laid along the bottom of the spring, the nipple $c$ pushed through the hole in the gaiter, and the latter secured first at one end, and then coiled around tightly and secured at the other end. This construction has the advantage that one size of gaiter will serve for springs of somewhat different sizes and lengths as the angle of the spiral can be changed to some extent, but it is not so easy to make the overlapping edges grease tight.

The nipple $c$ is preferably arranged nearer to the outer end than to the middle of the spring, as the grease is most required at the outer end where the spring leaves overlap (Figs. 1 and 1ª). The nipple may advantageously be a little to one side of the center line, as shown in some of the figures, as it may be difficult to put on a "grease gun" or the like for filling purposes in a directly vertical position, but easier to do so at a slight angle. The nipple may be at the side of the gaiter if desired, leading by a groove in the felt or by a tube to the channel in the bottom pad, and more than one nipple may be provided on each gaiter if desired. Instead of a nipple $c$ with a small cap which is removed when a grease gun or filler is to be applied, a nipple may be used like a Stauffer lubricator, *i. e.* with a cup for grease and a screw cap which, when turned, forces some of the grease in to the gaiter. In this way the supply of grease can be maintained longer without a fresh filling. Instead of laces and hooks, tabs and so forth for securing the gaiters and sheaths, any other securing means may be used. The pads of felt or the like may be held in place by staples, or by sewing and so forth, whichever may be the most convenient in each case.

Whenever the gaiter is to be applied to a spring inverted in position, *i. e.* with its leaves overlapping along the top thereof as at the upper part of Figs. 1 and 1ª, the pad *b* or *v* and the nipple *c'* should preferably be at the top or side, and the gaiter should lace at the side or bottom, and an outer sheath *q* closing along the bottom should preferably be used also as shown. The nipple *c'* should project in this case through a hole in the sheath, and may be secured by a clamping nut or otherwise so as to prevent ingress of moisture around it. The invention is applicable to vehicle springs of any usual form, including cantaliver springs, and three-quarter or full elliptical springs.

The gaiters may be formed of leather or any other suitable material which will be waterproof, flexible and of sufficient strength to withstand wear. Pads of felt have been referred to for use inside the gaiter and along the edges and ends thereof, but layers of any other absorbent material may be used which will become impregnated with grease in the manner required. The grease may be supplied in any convenient way, and if preferred without the use of a nipple, although the nipple is a convenient device for facilitating the injection of more grease when required, without opening the gaiter.

Having thus described my invention what I claim as new and desire to secure by Letters Patent is:—

1. A casing for a vehicle spring, said casing being formed of strong flexible material adapted to be wrapped around the spring, means for closing the overlapping edges and the ends of the casing in a fluid tight manner so as to prevent ingress of moisture, a pad of absorbent material inside the casing adapted to lie along the overlapping spring leaves, said pad being channeled longitudinally, and means for supplying lubricant to the longitudinal channel of the said pad when the casing is closed, whereby the lubricant supplied will be conducted along the surface of the spring leaves where they overlap.

2. A casing for a vehicle spring, said casing being formed of strong flexible material adapted to be wrapped around the spring, strips of absorbent material applied along the edges of the casing where they overlap, and adapted when soaked with grease to form a fluid tight closure where such overlapping occurs, a pad of absorbent material inside the casing adapted to lie along the overlapping spring leaves, and means for maintaining the supply of lubricant to the said pad.

3. A casing for a vehicle spring, said casing being formed of strong flexible material adapted to be wrapped around the spring, strips of absorbent material applied along the edges of the casing where they overlap and also at the ends of the casing where it is wrapped around the spring, said strips of material being adapted when soaked with grease to form a fluid tight closure at the overlapping edges and around the ends of the casing so as to prevent ingress of moisture, a pad of absorbent material inside the casing adapted to lie along the overlapping spring leaves, and means for maintaining the supply of lubricant to the said pad.

4. A casing for a vehicle spring, said casing being formed of strong flexible material adapted to be wrapped around the spring, means for closing the overlapping edges and the ends of the casing in a fluid tight manner so as to prevent ingress of moisture, a pad of absorbent material inside the casing adapted to lie along the overlapping spring leaves, said pad being formed with conducting channels in its inner face adapted to lead the lubricant along the surface of the spring leaves and laterally thereof at a plurality of points, a nipple for the supply of lubricant opening into the channel of the said pad and extending outside the casing, and means for closing the said nipple outside the casing.

5. A casing for a vehicle spring consisting of a sheet of leather adapted to be wrapped around the spring, means for fastening the casing around the spring, strips of absorbent material along the overlapping edges and inside the ends of the casing where they embrace the spring when said casing is closed, said strips when saturated with lubricant being adapted to form a closure which will repel the ingress of moisture, a pad adapted to lie along the surface of the leaves of the vehicle spring, a nipple projecting through the casing and terminating in the said pad, such nipple being so disposed as to project at a point adjacent to the line where the overlapping edge of the casing lies when the casing is closed.

6. A casing for a vehicle spring consisting of a piece of material adapted to wrap around the spring with means for securing it thereon, a second piece of material adapted to wrap around the first piece and to form an outer cover inclosing the inner portion of the casing, means for securing the outer cover, strips of absorbent material along the overlapping edges and around the ends of the inner portion of the casing adapted when supplied with lubricant to form a closure which will repel ingress of moisture, a pad of absorbent material disposed inside the inner portion of the casing and adapted to lie along the surface of the vehicle spring where its leaves overlap, and means for maintaining the supply of lubricant to the said pad and to the interior of the inner portion of the casing.

SIMON JOSEPH.